United States Patent [19]

Carayannis et al.

[11] Patent Number: 5,251,284
[45] Date of Patent: Oct. 5, 1993

[54] OPTIMAL PARAMETRIC SIGNAL PROCESSOR WITH LATTICE BASIC CELL

[75] Inventors: George Carayannis; Christos Halkias; Elias Koukoutsis, all of Athens, Greece; Dimitris Manolakis, Chestnut Hill, Mass.

[73] Assignee: Adler Research Associates, Union, N.J.

[21] Appl. No.: 826,262

[22] Filed: Jan. 22, 1992

Related U.S. Application Data

[63] Continuation of Ser. No. 423,540, Oct. 11, 1989, abandoned, which is a continuation-in-part of Ser. No. 298,338, Jan. 13, 1989, abandoned, which is a continuation of Ser. No. 904,382, Sep. 4, 1986, abandoned, which is a continuation-in-part of Ser. No. 837,260, Mar. 7, 1986, abandoned.

[51] Int. Cl.$^5$ ............................................. G10L 9/02
[52] U.S. Cl. ........................................................ 395/2
[58] Field of Search ................................. 381/29–53; 395/2; 364/133, 724.01, 724.15, 724.17

[56] References Cited

U.S. PATENT DOCUMENTS

| | | | |
|---|---|---|---|
| 3,662,115 | 5/1972 | Saito et al. | 364/724.15 |
| 4,340,781 | 7/1982 | Ichikawa et al. | 381/41 |
| 4,378,469 | 3/1983 | Fette | 381/41 |
| 4,389,540 | 6/1983 | Nakamura et al. | 381/41 |
| 4,401,855 | 8/1983 | Broderson et al. | 381/41 |
| 4,544,919 | 10/1985 | Gerson | 364/724 |
| 4,641,238 | 2/1987 | Kneib | 364/200 |
| 4,740,906 | 7/1988 | Renner et al. | 364/724 |
| 4,750,190 | 5/1988 | Moreau et al. | 375/27 |

OTHER PUBLICATIONS

N. Levinson, "The Wiener RMS (Root-Mean-Square) Error Criterion in Filter Design and Prediction", J. Math Phys., vol. 25, pp. 261–278, Jan., 1947.

J. Durbin, "The Filtering of Time Series Models", Rev. Int. Statist. Inst., vol. 28, pp. 233–244, 1960.

H. Lev-Ari and T. Kailath, "Schur and Levinson Algorithms for Non-Stationary Processes", IEEE International Conference on Acoustics, Speech and Signal Processing, 1981, pp. 860–964.

Le Roux and Gueguen, "A Fixed Point Computation of Partial Correlation, Coefficients", IEEE Transactions on Acoustics, Speech, and Signal Processing, Jun. 1977, pp. 257–259.

Kung and Hu, "A Highly Concurrent algorithm and Pipelined Architecture for Solving Toeplitz Systems", IEEE Transactions on Acoustics, Speech and Signal Processing, vol. ASSP-31, No. 1, Feb. 1983, pp. 66–76.

G. Carayannis et al., "A New Look on the Parallel Implementation of the Schur Algorithm for the Solution of Toeplitz Equations", IEEE International Conference on Acoustics, Speech and Signal Processing, Mar. 26–29, 1985.

G. Caraynnis et al., "Fast Recursive Algorithms for a Class of Linear Equations", IEEE Transactions on Acoustics, Speech and Signal Processing, vol. ASSP-30, No. 2, Apr. 1982, pp. 227–239.

Primary Examiner—Allen R. MacDonald
Assistant Examiner—Michelle Doerrler
Attorney, Agent, or Firm—Davis Hoxie Faithfull & Hapgood

[57] ABSTRACT

An optimal parametric signal processor, which receives autocorrelation coefficients, provides lattice coefficients in an optimal manner, and allows the use of any number of available parallel processing units. The signal processor may be implemented in a fully parallel or fully sequential manner, or in a "parallel-partitioned" implementation which provides the benefits of parallel processing, manageable hardware complexity, and optimal signal processing for a given number of available processors. By using a "lattice basic cell" structure, hardware complexity is minimized.

24 Claims, 10 Drawing Sheets

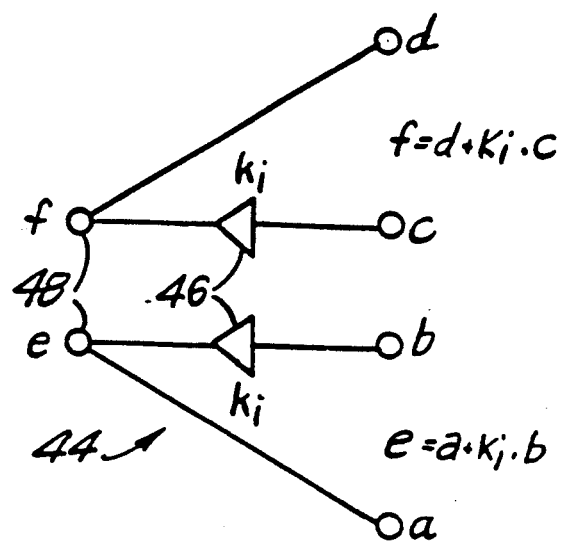
FIG.4 "BUTTERFLY" BASIC CELL (BBC)
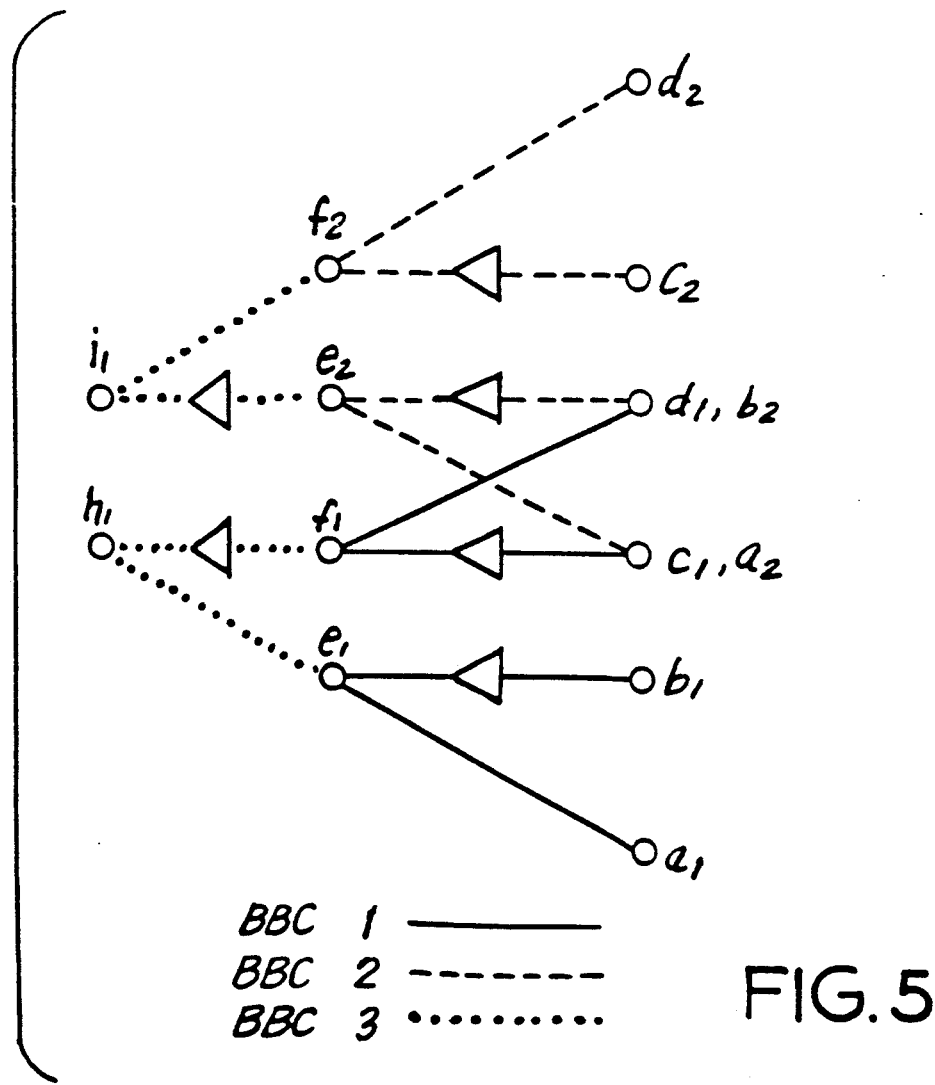
FIG.5

OPTIMAL PARAMETRIC SIGNAL PROCESSOR WITH LATTICE BASIC CELL

CROSS-REFERENCE TO RELATED APPLICATIONS

This is a continuation of copending application Ser. No. 07/423,540 filed on Oct. 11, 1989 now abandoned and which was a continuation of Ser. No. 07/298,338, now abandoned filed on Jan. 13, 1989, which was a continuation of Ser. No. 06/904,382 filed on Sep. 4, 1986, now abandoned and which was a continuation-in-part of co-pending, U.S. patent application Ser. No. 837,260, now abandoned by Carayannis et al., filed Mar. 7, 1986, and entitled OPTIMAL PARAMETRIC SIGNAL PROCESSOR, the entire disclosure of which is hereby incorporated by reference thereto.

FIELD OF THE INVENTION

The present invention relates to the field of signal processing, and in particular, parametric signal processing.

BACKGROUND OF THE INVENTION

Parametric signal processing is used in many areas, such as speech and image analysis, synthesis and recognition, neurophysics, geophysics, array processing, computerized tomography, communications and astronomy, to name but a few.

One example of signal processing of particular importance is the linear prediction technique, which is used for speech analysis, synthesis and recognition, and for the processing of seismic signals, to enable the reconstruction of geophysical substrata. The linear prediction technique employs a specialized autocorrelation function.

Another form of signal processing which finds a multitude of applications, is the determination of an optimal (in the least square sense) finite impulse response filter. A signal processor employing such a technique works with the autocorrelation of the filter input signal and the cross-correlation between the input and the desired response signal, and may be used in many of the above-mentioned applications.

Still another form of signal processing of particular importance is known in the art as "L-step ahead" prediction and filtering, for solving the "optimum lag" problem. This technique is especially useful in designing spiking and shaping filters. Signal processors which perform this function employ a specialized autocorrelation function which also takes into account a time lag associated with the system.

Generally, as the order of the system under investigation increases, the complexity of the signal processing necessary to provide useful information also increases. For example, using the general Gaussian elimination procedure, a system of order p can be processed in "$O(p^3)$" steps, indicating the number of steps as being "on the order of" $p^3$, i.e., a function of p cubed. Thus, it will be appreciated that a system having order of p=100 requires on the order of one million processing steps to process the signal, a limitation of readily apparent significance, especially where real time processing is required.

Signal processing techniques have been developed which have reduced the number of operations required to process a signal. One such method has been based on a technique developed by N. Levinson, which requires $O(p^2)$ sequential operations to process the signal. In particular, the "Levinson technique" requires $O(2 \cdot p^2)$ sequential operations in order to process the signal. An improved version of this technique, known as the "Levinson-Durbin" technique requires $O(1 \cdot p^2)$ sequential operations to process the signal. Neither of these schemes is suitable for parallel implementation. On the general subject of the Levinson and Levinson-Durbin techniques, see N. Levinson, "The Wiener RMS (Root-Mean-Square) Error Criterion in Filter Design and Prediction", *J. Math Phys.*, Vol. 25, pages 261–278, January 1947; and J. Durbin, "The Fitting of Time Series Models", *Rev. Int. Statist. Inst.*, Vol. 28, pages 233–244, 1960.

Although they represent an order of magnitude improvement over the Gaussian elimination technique, the Levinson and Levinson-Durbin techniques are too slow for many complex systems where real time processing is required.

Another way of implementing the main recursion of the Levinson-Durbin technique, for the computation of what is widely known as "lattice coefficients", was developed by Schur in 1917, in order to establish a system stability criterion. See I. Schur, "Uber Potenzreihen Die Im Innern Des Einheitskreises Beschrankt Sind", *J. Reine Anoewandte Mathematik, Vol.* 147, 1917, pages 205–232. Lev-Ari and Kailath, of Stanford University, have developed a different approach, based on the Schur and Levinson techniques, which provides a triangular "ladder" structure for signal processing. The Lev-Ari and Kailath technique uses the signal, per se, as the input to the processor, rather than autocorrelation coefficients, and it is used in the signal modelling context. See H. Lev-Ari and T. Kailath, "Schur and Levinson Algorithms for Non-Stationary Processes", *IEEE International Conference on Acoustics, Speech and Signal Processing*, 1981, pages 860–864.

In another modification to the Schur technique, Le Roux and C. Gueguen re-derived the Schur algorithm, giving emphasis to the finite word length implementation, using fixed point arithmetics. See Le Roux and Gueguen, "A Fixed Point Computation of Partial Correlation, Coefficients", *IEEE Transactions on Acoustics, Speech, and Signal Processing*, June 1977, pages 257–259.

Finally, Kung and Hu, have developed a parallel scheme, based on the Schur technique, which uses a plurality of parallel processors, to process a signal, having order p, in $O(p)$ operations, a significant improvement compared to the Levinson-Durbin technique. See Kung and Hu, "A Highly Concurrent Algorithm and Pipelined Architecture for Solving Toeplitz Systems", *IEEE Transactions on Acoustics, Speech and Signal Processing*, Vol. ASSP-31, No. 1, February 1983, pp. 66–76. However, the application of the Kung and Hu technique is severely limited insofar as it requires that the number of processors be equal to the order of the system to be solved. Thus, the Kung and Hu technique cannot process a signal produced by a system having an order greater than the number of parallel processors. System complexity is therefore a major limiting factor in using the Kung and Hu technique, insofar as many complex systems may have orders much higher than the number of parallel processors currently available in modern VLSI or other technology.

OBJECTS AND SUMMARY OF THE INVENTION

It is therefore an object of the present invention to overcome the difficulties associated with prior art signal processors and methods.

It is another object of the present invention to provide an optimal parametric signal processor and processing method.

It is another object of the present invention to provide a signal processor and processing method which can be implemented using (i) a single processing unit, to process a signal in a fully sequential manner, (ii) a plurality of processing units to process a signal in fully parallel manner, or (iii) a lesser plurality of processing units to process a signal in a "partitioned parallel" manner.

It is another object of the present invention to provide a linear prediction signal processor which also forms the basis for L-step ahead and least square-finite impulse response (LS-FIR) processors.

It is another object of the present invention to provide a signal processing structure having minimal hardware complexity.

In accordance with a basic aspect of the present invention, a signal processor which receives autocorrelation coefficients corresponding to a system, for providing lattice coefficients of the system, comprises processor means for (1) receiving a plurality of autocorrelation coefficients;

(2) multiplying a first pair of adjacent autocorrelation coefficients by a first lattice coefficient, resulting in respective first and second products, and for adding (i) one of the first pair of autocorrelation coefficients to the first product, and (ii) the other of said first pair of coefficients, to the second product, to yield a first pair of first intermediate values, during a first time interval;

(3) multiplying a second pair of adjacent autocorrelation coefficients by the first lattice coefficient, resulting in respective third and fourth products, and for adding (i) one of the second pair of autocorrelation coefficients to the third product, and (ii) the other of the second pair of coefficients to the fourth product, to yield a second pair of first intermediate values, during a second time interval; and (4) multiplying a selected first and second of the first intermediate values by a second lattice coefficient, resulting in respective fifth and sixth products, and for adding (i) the first of the first intermediate values to the sixth product, and (ii) the second of said first intermediate values to the fifth product, to yield a pair of second intermediate values, during a third time interval; and divider circuitry for forming the quotient of a selected pair of autocorrelation coefficients to produce the first lattice coefficient, and for forming the quotient of a selected pair of the first intermediate values to produce the second lattice coefficient.

The processor means may comprise a plurality of parallel processing units, wherein the first and second time intervals occur substantially simultaneously, and precede the third time interval, to provide a fully parallel, or "parallel-partitioned" signal processing. Alternatively, the processor means may comprise a single processing unit, wherein the first time interval precedes the second time interval, which in turn precedes the third time interval, to provide a fully sequential signal processor.

In accordance with another aspect of the present invention, a signal processor which receives autocorrelation coefficients of a system, for providing lattice coefficients of the system, comprises an input device for receiving the autocorrelation coefficients, and at least two parallel processing units, each of which includes a processor for (i) multiplying a first one of the autocorrelation coefficients by a first lattice coefficient, resulting in a first product, (ii) multiplying a second one of the autocorrelation coefficients, adjacent to the first one of the autocorrelation coefficients by the first lattice coefficient, resulting in a second product, (iii) and adding (a) the second one of the autocorrelation coefficients to the first product, and (b) the first one of the autocorrelation coefficients to the second product, to yield a pair of first intermediate values. A storage and retrieval structure is provided for applying at least one of the pair of first intermediate values from each of the processing units to at least one of the processing units, to thereby multiply a respective first and second of the first intermediate values by a second lattice coefficient to produce respective third and fourth products, and to add the first of the first intermediate values to the fourth product and the second of the first intermediate values to the third product, to yield a respective pair of second intermediate values. Divider circuitry is also provided for forming the quotient of a selected pair of the autocorrelation coefficients to produce the first lattice coefficient, and for forming the quotient of a selected pair of the first intermediate values, to produce the second lattice coefficient.

Many other aspects of the present invention will become apparent to those skilled in the art, the above aspects being merely exemplary.

BRIEF DESCRIPTION OF THE DRAWINGS

The foregoing and other objects, aspects and embodiments of the present invention will be described in more detail below with reference to the following drawing figures, of which:

FIG. 4 illustrates a "butterfly basic cell" in accordance with the invention of the parent application;

FIG. 5 illustrates the repeated use of the basic cell of FIG. 4, in order to provide the processing structure of FIGS. 1 and 3, in accordance with the invention of the parent application;

DETAILED DESCRIPTION OF THE INVENTION

Figure 1:
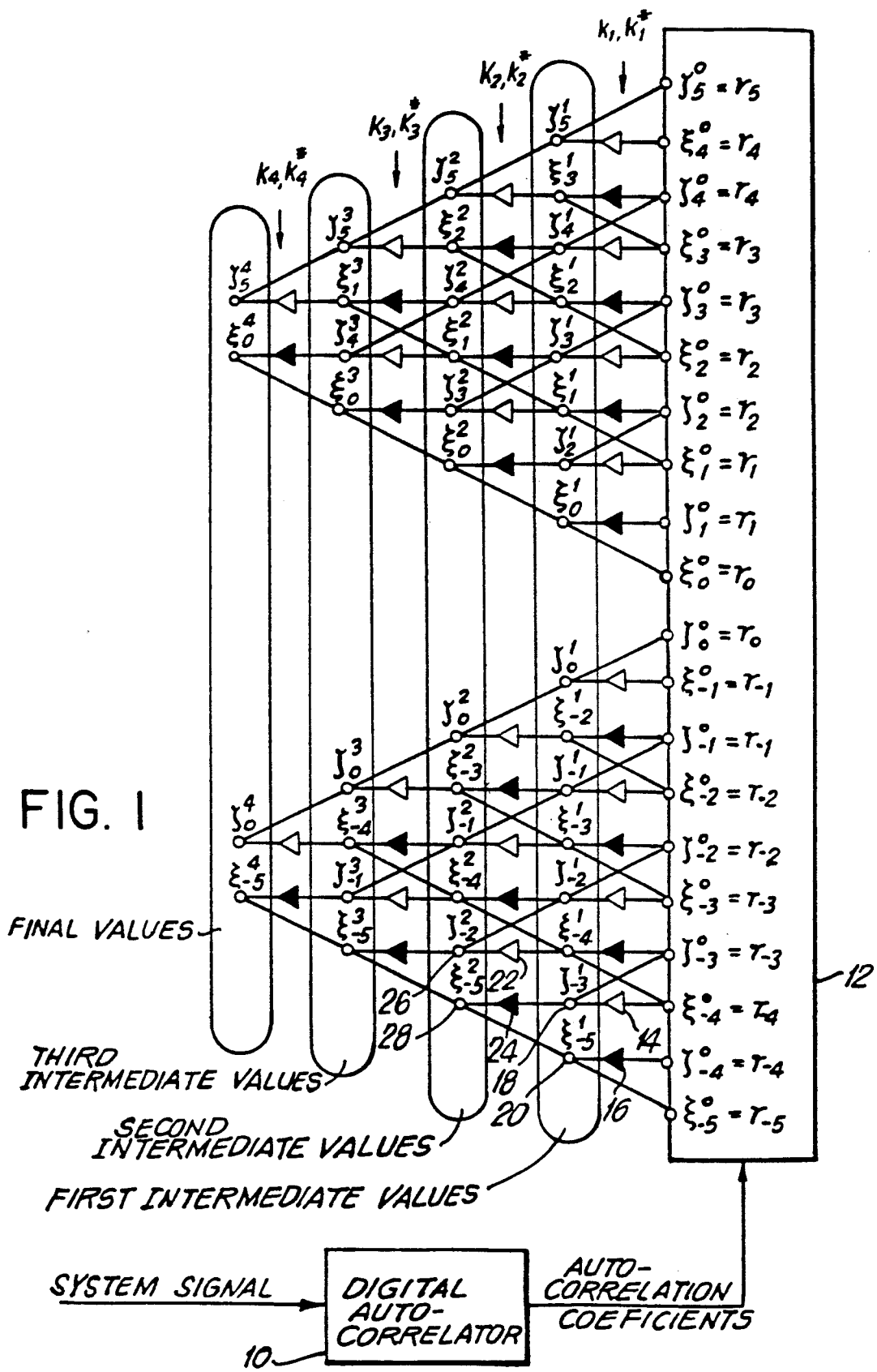
FIG. 1 illustrates the "superlattice" processing structure, for the non-symmetrical case, in accordance with the invention of the parent application.

Since the present invention flows from the invention of the parent application, Ser. No. 837,260, a description of the relevant parts of the parent application, as they relate to the present invention, will be made, with reference to FIGS. 1-5, herein.

The Non-Symmetrical Case

With reference to FIG. I, there is shown a "superlattice" structure of multipliers, designated by triangles, and adders, designated by circles, arranged in a manner to process a signal in order to produce a linear predictor for a non-symmetrical system. This superlattice structure also forms the basis for L-step ahead and LS-FIR processors.

As shown in the figure, a signal from a system, having order P, such as a seismic signal, is applied to a well known digital autocorrelator 10, which produces autocorrelation coefficients $r_{-5}$ through $r_5$. The autocorrelation coefficients are delivered to an input device 12, such as a digital register, or buffer memory, for application to the superlattice structure. With the exception of autocorrelation coefficients $r_{-5}$, $r_0$ and $r_5$, each autocorrelation coefficient is applied to a pair of multipliers which function to multiply each coefficient by a pair of "lattice coefficients" $k_n$ and $k_n^*$, $k_n$ being the normal lattice coefficient, and $k_n^*$ being the "adjoint" lattice coefficient. The multipliers indicated by white triangles function to multiply the autocorrelation coefficients by the normal lattice coefficient $k_n$, while the multipliers indicated by the black triangles function to multiply the autocorrelation coefficients by the adjoint lattice coefficients $k_n^*$. Production of the normal and adjoint lattice coefficients will be described below.

The two products produced by multiplying each autocorrelation coefficient by the normal and adjoint lattice coefficients are added, in the adders indicated by the circles in the figure, to an adjacent pair of autocorrelation coefficients, to produce a set of first intermediate values $\zeta_n^1$, where $n = -3, -2, -1, 0, 2, 3, 4, 5$, and $\xi_m^1$, where $m = -5, -4, -3, -2, 0, 1, 2, 3$. For example, the autocorrelation coefficient $r_{-4}$, is multiplied by $k_1$ and $k_1^*$ in multipliers 14 and 16, respectively, and the products are added to the pair of autocorrelation coefficients $r_{-3}$ and $r_{-5}$, which are adjacent to coefficient $r_{-4}$, in adders 18 and 20, respectively. Similarly, autocorrelation coefficient $r_{-3}$, after multiplication by lattice coefficients $k_1$ and $k_1*$, is individually added to the adjacent pair autocorrelation coefficients $r_{-4}$ and $r_{-2}$. The same process takes place for autocorrelation coefficients $r_{-2}$ through $r_4$, to produce the set of first intermediate values, as shown.

For the sake of continuity, the autocorrelation coefficients $r_{-5}$ through $r_5$, are also designated as $\zeta_n^0$ and $\lambda_m^0$, where $n = -4$ to 5 and $m = -5$ to 4.

The lattice coefficients are calculated as follows:

$$k_{m+1} = -\zeta_{m+1}^1/\zeta_0^m$$

$$k^*_{m+1} = \xi_{m+1}^m/\xi_0^m$$

The lattice coefficients $k_1$ and $k_1*$ are produced directly from the autocorrelation coefficients, while the second set of lattice coefficients, $k_2$ and $k_2^*$, are calculated from the first intermediate values.

In a manner similar to that performed to generate the first intermediate values, selected pairs of adjacent first intermediate values, for example, $\xi_{-4}^1$ and $\zeta_{-3}^1$ are multiplied by the normal and adjoint lattice coefficients $k_2$ and $k_2*$, respectively, in multipliers 22 and 24. Two first intermediate values $\zeta_{-2}^1$ and $\xi_{-5}^1$, adjacent to, and on either side of the selected pair, are added to the products produced by multipliers 22 and 24 in adders 26 and 18, respectively, to produce two second intermediate values $\zeta_{-2}^2$ and $\xi_{-5}^2$. The remaining second intermediate values are generated in a similar manner, namely, by multiplying a selected pair of adjacent first intermediate values by the normal and adjoint lattice coefficients $k_2$ and $k_2^*$, and by adding to the products, the first intermediate values adjacent to, and on either side of, the selected pair.

It will also be seen that, following this signal flow, the third intermediate values and final intermediate values are generated in a similar manner.

It will be seen that this superlattice structure therefore implements the Schur-typ recursions of the form $$\zeta_i^m = \zeta_i^{m-1} + k_m \xi_{i-m}^{m-1},$$
$$\text{and}$$
$$\xi_i^m = \xi_i^{m-1} + k_m^* \zeta_{i+m}^{m-1}$$

The lattice coefficients $k_i$ completely characterize the linear predictor and can be used instead of the direct predictor coefficients. In fact, they are preferred for storage, transmission and fast speech synthesis, since they have the considerable advantages of being ordered, bounded by unity and can readily be used for stability control, efficient quantization, and the like. Since r0 corresponds to the energy of the signal, and will therefore have the greatest amplitude of any of the signals processed by the superlattice, all variables can be normalized with respect to $r_0$, thus facilitating the use of "fixed point" processing with its attendant advantages of precision, speed, and processing simplicity.

The arrangement shown in FIG. 1 can produce lattice coefficients for a system of the type $Ra = -d$, where R has a Toeplitz structure. A detailed analysis of this technique is given by G. Carayannis et al., "A New Look on the Parallel Implementation of the Schur Algorithm for the Solution of Toeplitz Equations", *IEEE International Conference on Acoustics. Speech and Signal Processing*, Mar. 26-29, 1985, the entire disclosure of which is hereby incorporated by reference.

Figure 2:
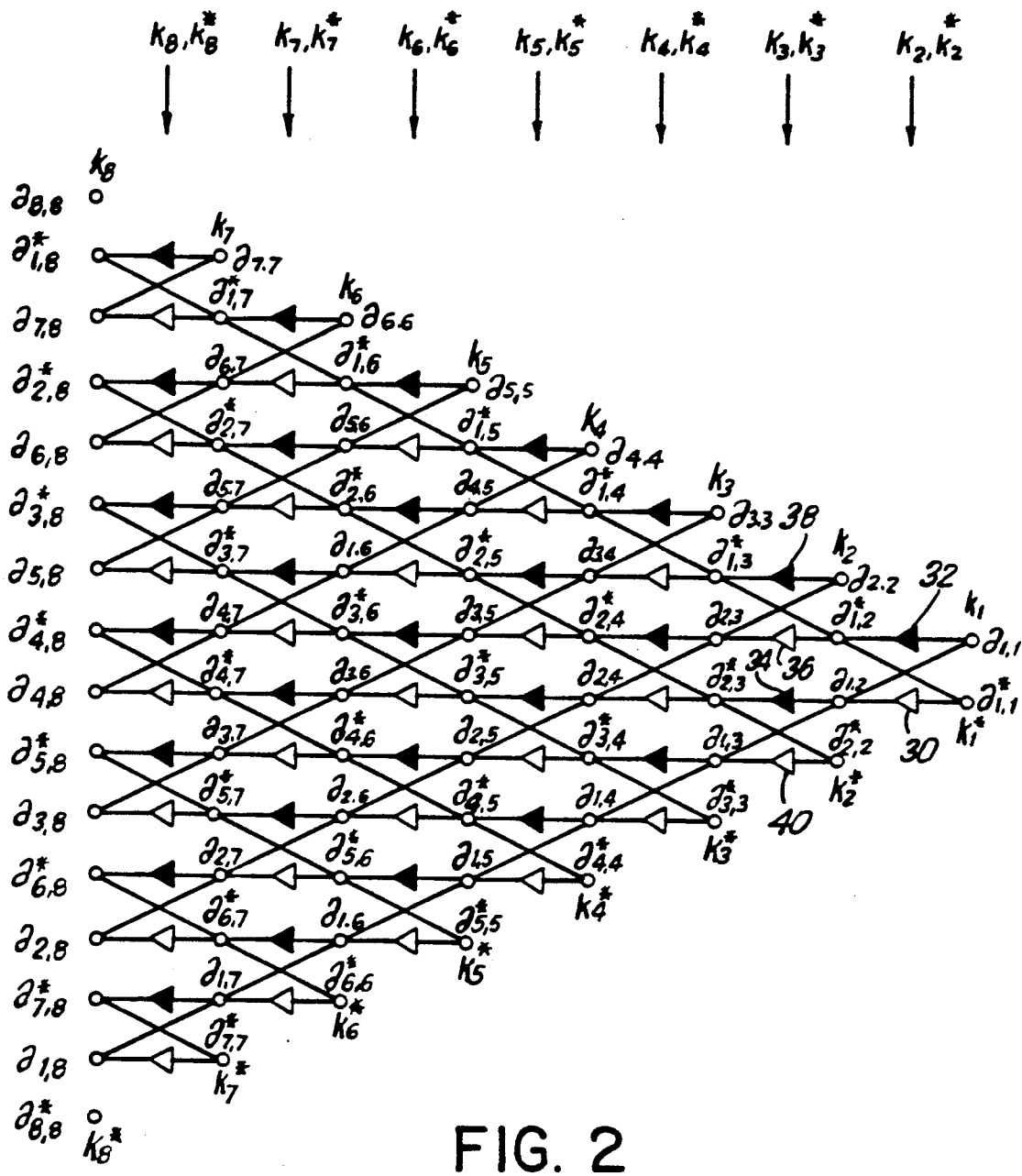
FIG. 2 illustrates the signal processing structure which allows the direct predictor coefficients $a_i$, to be derived from the lattice coefficients $k_i$ produced by either the structure of FIG. 1 or the corresponding structure of the present invention.

Although the lattice coefficients $k_i$ and $k_i^*$ are usually preferred, the direct predictor coefficients $a_i$, which are useful in spectral estimation, for example, can be derived from the lattice coefficients using the processing structure of FIG. 2. As shown, the lattice coefficients $k_1$ and $k_1*$ are applied to a pair of multipliers 30 and 32, which function to multiply those lattice coefficients by the second lattice coefficients $k_2$ and $k_2*$, respectively, to produce a first set of products $a_{1,2}$ and $a*_{1,2}$, respectively. These products are then multiplied, in multipliers 34 and 36, respectively, by $k_3*$ and $k_3$, and added to $k_2*$ and $k_2$, respectively, to produce the values $a*_{2,3}$ and $a_{2,3}$, respectively. Also, the value of the lattice coefficients $k_2$ and $k_2*$ are multiplied by $k_3*$ and $k_3$, respectively, in multipliers 38 and 40, and the intermediate values $a*_{1,2}$ and $a_{1,2}$ are added to these products to produce further intermediate values $a*_{1,3}$ and $a_{1,3}$, respectively. This process continues until the direct filter coefficients $a_{1,8}$ through $a_{8,8}$ and $a*_{1,8}$ through $a*_{8,8}$ are produced. Though described with reference to the parent application, the processing structure of FIG. 2 can also be used with the present invention, as will be appreciated by those skilled in the art.

The Symmetrical Case

A special situation exists where the system to be analyzed can be characterized by $Ra = -d$, where R has a symmetrical Toeplitz structure, as in the case of autoregressive linear prediction. In such cases, the superlattice structure of FIG. 1 is simplified to the symmetrical superlattice form shown in FIG. 3, since $r_i = r_{-i}$, $k_i = k_i*$ and $\zeta_i^m = \epsilon_{-i}^m$, for the symmetrical case. Thus, the two triangular lobes of FIG. 1 become identical, so that one of them can be omitted, allowing the elimination of half of the signal processing. It will be seen that signal processing structure for the symmetrical case, shown in FIG. 3, provides linear prediction, or auto-regressive modelling, by calculating the lattice coefficients, or in the symmetrical case, the "PARCOR" (partial correlation) coefficients.

It should initially be noted that with this signal processing structure (as well as that shown in FIG. 1) there is no redundancy. That is, each $\zeta$ appearing in the processor is produced only once. Additionally, only those signals needed for the production of lattice coefficients, or PARCORs are involved. Thus, the signal processing structure shown in FIG. 3 (and in FIG. 1) represent optimal processing schemes.

In a manner similar to that shown for the nonsymmetrical case of FIG. 1, a system signal is applied to a digital autocorrelator 10, which produces autocorrelation coefficients which characterize the symmetrical system, namely, $r_0$ through $r_8$. The coefficients are applied to an input device 42, such as a digital register or memory. Note that the signal processor of FIG. 3 receives a signal from a system having an order of 8, whereas the system in FIG. 1 receives a signal from a system having an order of 5.

Figure 3:
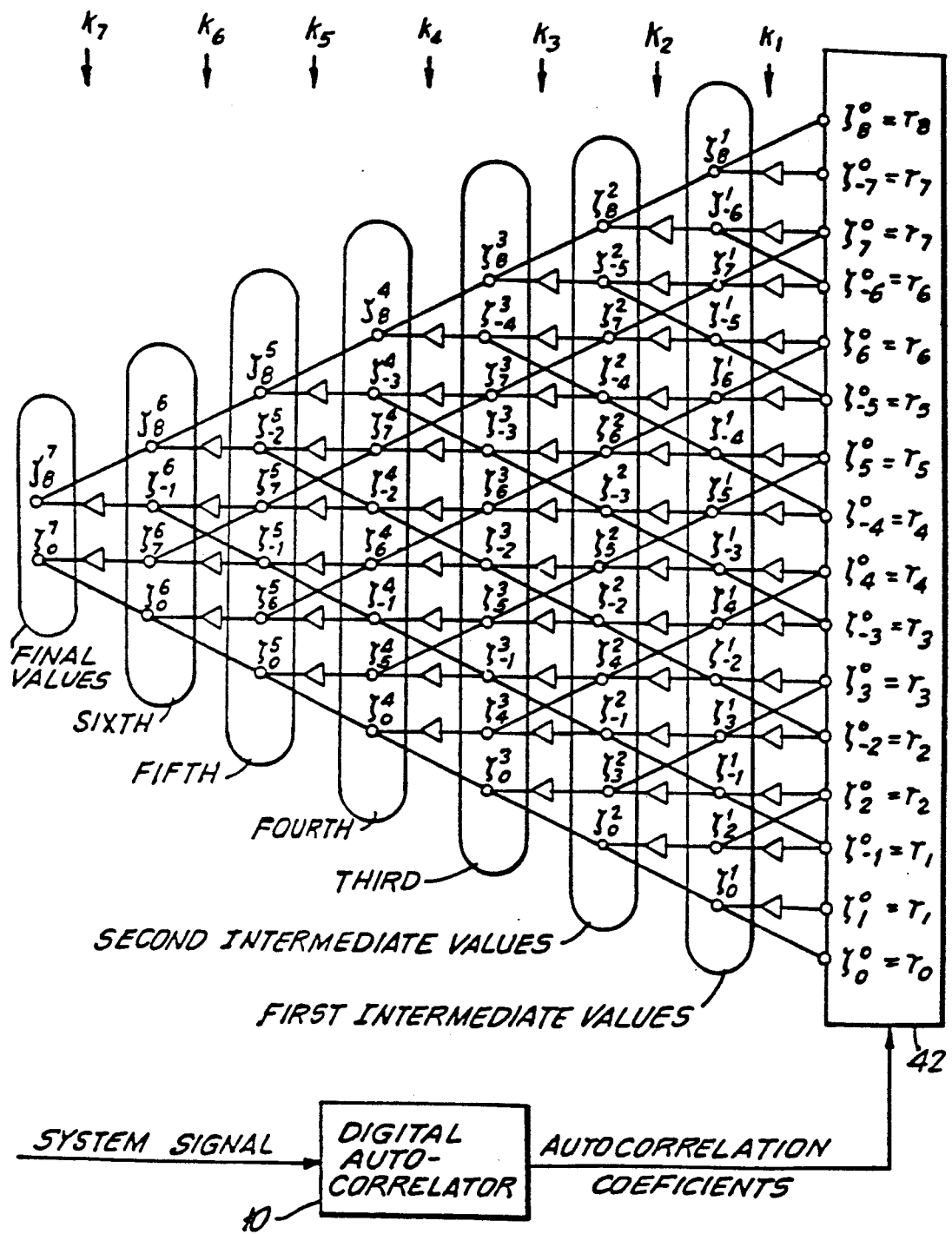
FIG. 3 illustrates the "superlattice" processing structure for the symmetrical case, in accordance with the invention of the parent application.

As with the signal processor of FIG. 1, the signal processor of FIG. 3 takes each autocorrelation coefficient, except the first and last, namely $r_0$ and $r_8$, and multiplies it by the first lattice coefficient $k_1$, which is calculated from $r_0$ and $r_1$ ($\zeta_0^0$, $\zeta_1^0$), according to the general formula $k_p = -\zeta_p^{p-1}/\zeta_0^{p-2}$. The product of each such multiplication is added, individually, to the adjacent two autocorrelation coefficients, to produce the first intermediate values $\zeta_n^1$, where $n = 0, 2$ to $8$ and $-6$ to $-1$. For example, autocorrelation coefficient $r_1$, designated as $\zeta_1^0$ and $\zeta_{-1}^0$, for the sake of conformance with the intermediate variables, is multiplied by lattice coefficient $k_1$, and autocorrelation coefficients $r_0$ and $r_2$ are added, individually, to the product, to produce a pair of first intermediate values $\zeta_0^1$ and $\zeta_2^1$, respectively. Similarly, the next two first intermediate values, namely $\zeta_{-1}^1$ and $\zeta_3^1$ are produced by multiplying autocorrelation coefficient $r_2$ by the lattice coefficient $k_1$, and adding, individually, the adjacent autocorrelation coefficients, namely, $r_1$ and $r_3$ to the products.

The second intermediate values can be calculated from the first intermediate values in a similar manner. First, $k_2$ can be calculated from the ratio of $\zeta_2^1$ and $\zeta_0^1$ in accordance with the formula given above. Then, second intermediate values $\zeta_3^2$ and $\zeta_0^2$, for example, are calculated by multiplying the first intermediate values $\zeta_{-1}^1$ and $\zeta_2^1$ by the lattice coefficient $k_2$, and adding the adjacent first intermediate values $\zeta_3^1$ and $\zeta_0^1$ to the products, individually. The signal processing continues until the final values $\zeta_8^7$ and $\zeta_0^7$ are obtained, from which the last lattice coefficient $k_8$ can be calculated from the above formula.

The signal processor illustrated in FIG. 3 can be implemented as described with reference to FIGS. 4-8, of the parent application.

If direct predictor coefficients are desired, the processing structure shown in FIG. 2 can be employed for the symmetrical case as well as the non-symmetrical case. However, the processing structure of FIG. 2 is somewhat simplified for the symmetrical case since $k_n = k_n*$.

Returning to FIG. 3, implements recursions of the form $\zeta_i^m = \zeta_i^{m-1} + k_m \zeta_{m-i}^{m-1}$. the symmetrical superlattice of FIG. 3 several points should now be noted. Although drawn as a triangular lobe, to illustrate the precise details of the signal processing, it will be appreciated that the various items of hardware, namely, the multipliers, designated by triangles, and the adders, designated by circles, can be comprised of a single set of 14 multipliers and 14 adders which first function to produce the first intermediate values, then the second intermediate values, and so on through the final values. Furthermore, if 14 multipliers and adders are not available, a lesser number can be shared within any given group of intermediate values.

Butterfly Basic Cell

A first way to implement this approach, in accordance with one of the aspects of the invention of the parent application, is to utilize a structure which will be called the "butterfly basic cell" or "BBC".

Specifically, FIG. 4 illustrates a BBC 44 which comprises a pair of multipliers 46 and a pair of adders 48. As shown in FIG. 4, the BBC 44 functions to produce a signal $e = a + k_i \cdot b$, and a signal $f = d + k_i \cdot c$.

The BBC can be realized with one "two-cycled" processor, or two "one-cycled" processors, to provide signals e and f. The use of the BBC, as defined in FIG. 4, provides a homogeneous configuration in the hardware, in the sense that the repetition of the same BBC suffices to produce the whole superlattice structure.

More specifically, FIG. 5 illustrates three BBC's denoted by solid, dashed and dotted lines, respectively. By merely duplicating the processing unit illustrated in FIG. 4, a superlattice of any size can be "constructed", to process a signal of virtually any complexity. For example, the superlattice of FIG. 5 will process a signal from a system having order 3. To process a signal from a system having order 4, a first additional BBC can be "placed on top of" BBC 2, to produce first intermediate values $e_3$ and $f_3$ (not shown). A second additional BBC would similarly be added, to receive as inputs, $e_2$, $f_2$, $e_3$ and $f_3$, to produce outputs $h_2$, $i_2$ (not shown). Finally, a third additional BBC would be used to receive $h_1$, $i_1$, $h_2$ and $i_2$ as inputs, and produce outputs $j_1$ and $l_1$ (also not shown).

Lattice Basic Cell

Figure 6:
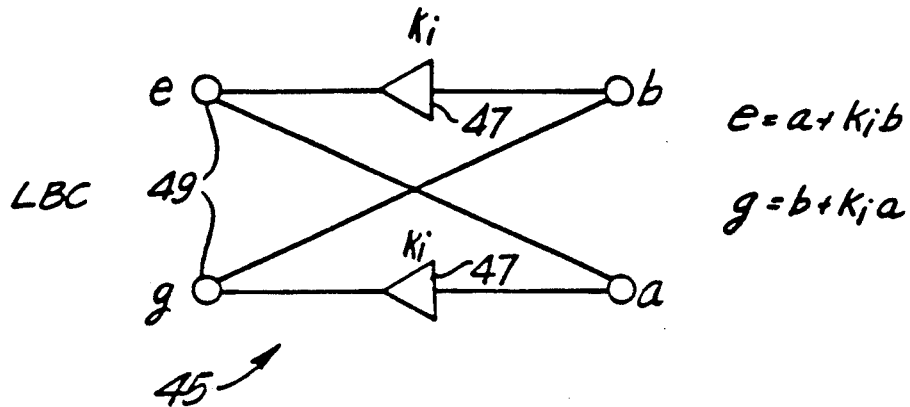
FIG. 6 illustrates a "lattice basic cell" in accordance with the present invention.

In accordance with the present invention, the processing required for the structure of FIG. 3 is implemented in the manner illustrated in FIG. 6, which illustrates a structure 45 which will be called the "Lattice Basic Cell" or "LBC". Specifically, the LBC 45, shown in FIG. 6, functions to take a pair of values a,b and multiply each of those values individually, in multipliers 47, by lattice coefficient $k_i$, and the respective products are added to the other of the inputs in adders 49, to produce values $e=a+k_i b$ and $g=b+k_i a$. Note that the same operation produces e and g when the inputs a and b are interchanged.

Figure 7:
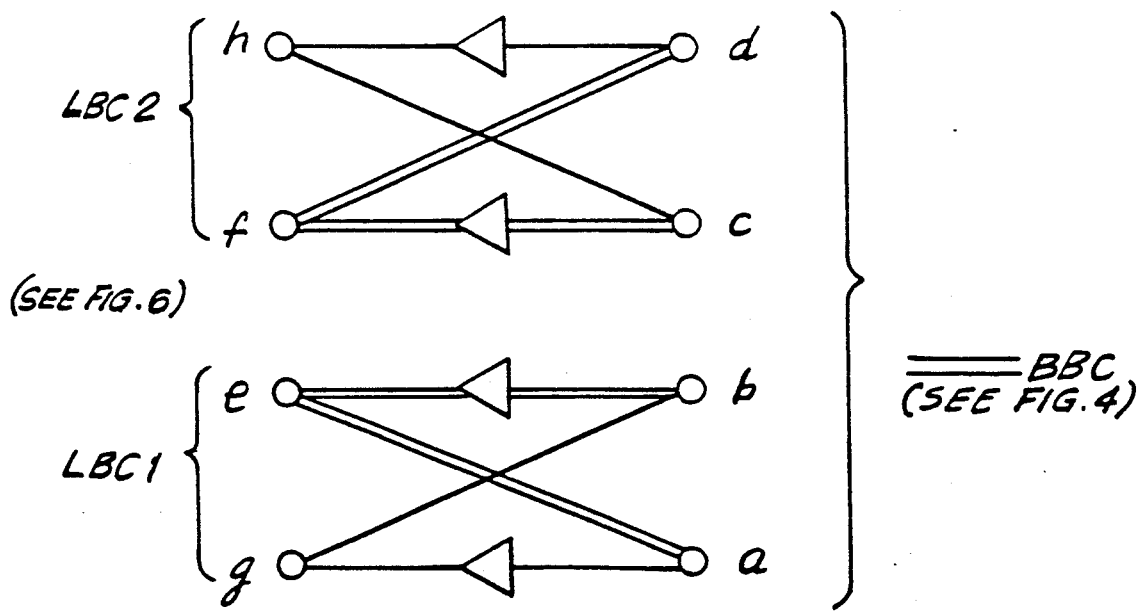
FIG. 7 illustrates the repeated use of the lattice basic cell, in accordance with the present invention, and its relationship to the butterfly basic cell.

FIG. 7 illustrates the relationship between the LBC of FIG. 6 and the BBC of FIG. 4. Specifically, within each adjacent pair of LBC's resides a single BBC. LBC 1 receives inputs a and b and produces outputs e and g therefrom, and LBC 2 similarly receives a pair of inputs, c and d, to produce a pair of outputs f and h. On the other hand, the BBC, illustrated in FIG. 7 by double lines, takes inputs a, b, c and d to produce a pair of outputs e and f, in a manner identical to that illustrated in FIG. 4.

Figure 8:
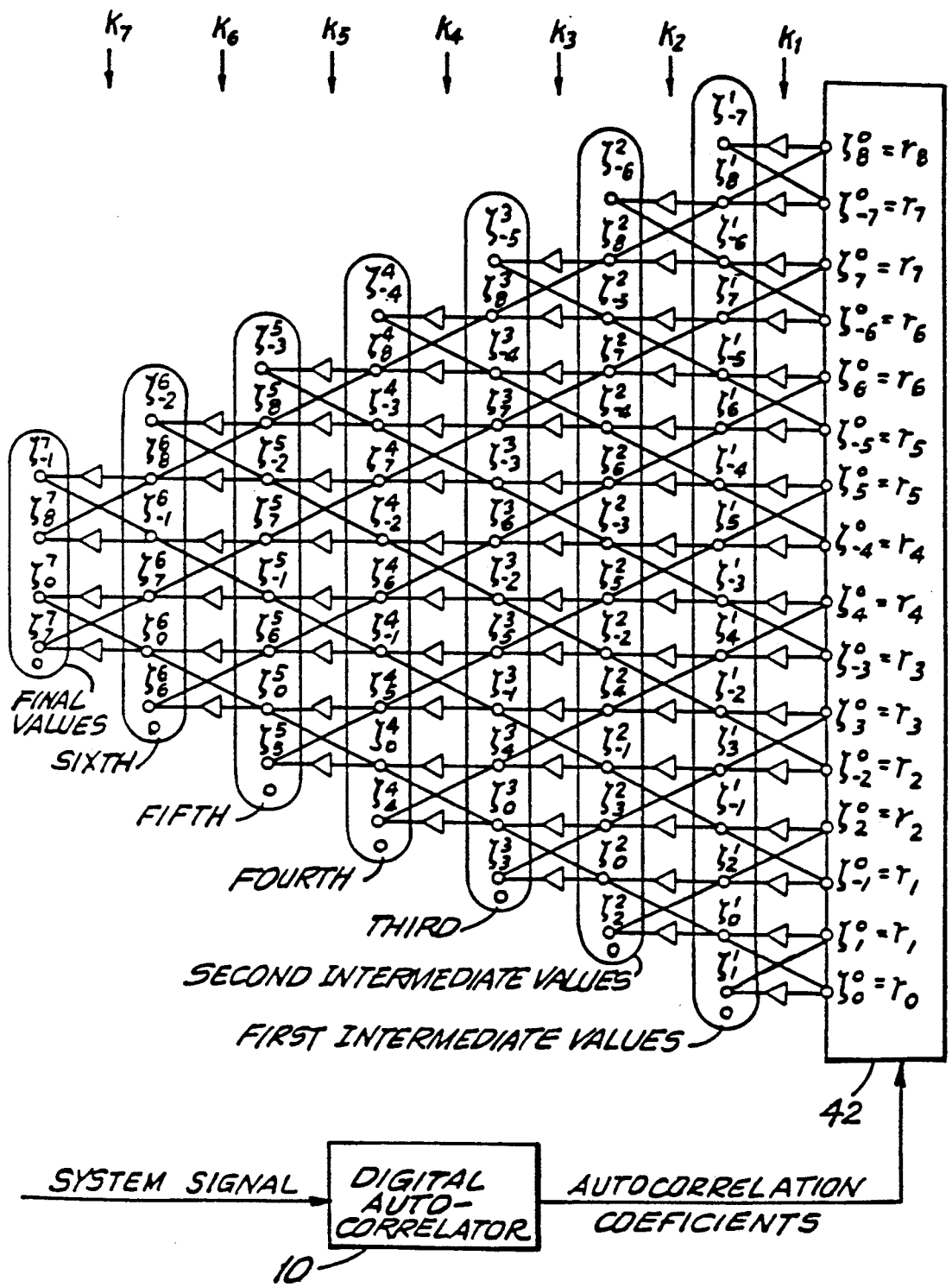
FIG. 8 illustrates the superlattice processing structure for the symmetrical case, in accordance with the present invention.

Thus, it will be appreciated that a structure similar to that shown in FIG. 3 can be implemented through the repetitive use of LBC's, rather than BBC's. One such implementation is illustrated in FIG. 8, which is identical to FIG. 3 except for the upper and lower extensions, which produce intermediate values $\zeta_n^n$, for n=1 to 7, along the lower border of the triangular lobe and $\zeta_n^1$, where n=−7 to −1 and i=1 to 7, respectively, along the upper border of the lobe. These additional extensions to the superlattice are due to the structure of the LBC's.

Although it may appear that the use of the LBC's leads to a structure which is not optimal, because of the upper and lower extensions of the superlattice, there is a distinct advantage when the LBC's are used instead of the BBC's: the use of the LBC's produces a superlattice in which the size of the bordering buffer can be reduced to one-half the size necessary in the case where BBC's are used, as will be fully explained below. The hardware implementation of the LBC's is therefore preferable over that of the BBC's.

Also, although the intermediate quantities in the upper extensions of the superlattice are not necessary for the solution of the eighth order signal, those quantities would be used for a signal having order nine The intermediate quantities $\zeta_n^n$ in the lower extensions are, by definition, zero, as a consequence of the Yule-Walker equations.

In view of the foregoing, it will be appreciated by those skilled in the art that the use of the LBC's to implement the superlattice illustrated in FIG. 8 can be achieved in a fully parallel implementation, in an order recursive implementation, or in a parallel partitioned implementation, as explained in detail, in the case of BBC's, in the parent application. A parallel partitioned implementation of the superlattice using the LBC's will now be described herein, since such implementation includes elements of both the fully parallel and order recursive implementations.

Partitioned Parallel Implementation Using LBC's

Figure 9:
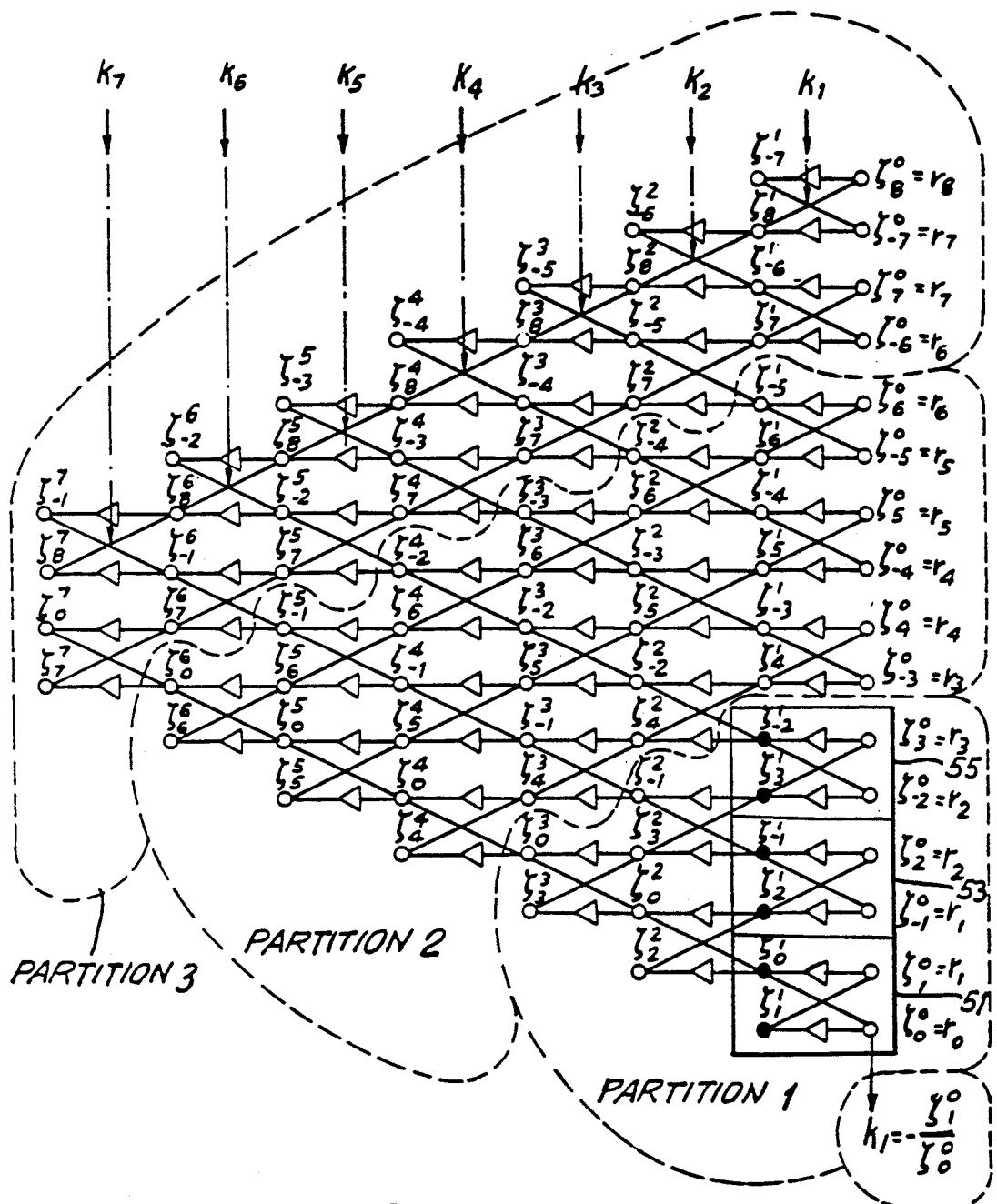
FIG. 9 illustrates the implementation of the superlattice structure using three lattice basic cells, for a system having order eight.

With reference to FIG. 9, three LBC's 51, 53 and 55 are illustrated within a superlattice structure for processing a signal from a system having order 8. The signal is processed using the three LBC's which process the autocorrelation coefficients $r_0$–$r_3$ to produce the first set of intermediate values $\zeta_n^1$, n=−2, 3, −1, 2, 0, and 1. At this point, $\zeta_{-2}^1$ is stored, and the intermediate values $\zeta_3^1$, $\zeta_{-1}^1$, $\zeta_2^1$ and $\zeta_0^1$ are fed back to the inputs of two of the LBC's, for example 53 and 55, and second intermediate values $\zeta_n^2$, n=−1, 3, 0, and 2 are produced. Then, $\zeta_{-1}^2$ is stored and the intermediate values $\zeta_3^2$ and $\zeta_0^2$ are fed back to a single LBC, for example 55, and processed to produce third intermediate values $\zeta_0^3$ and $\zeta_3^3$.

Thusfar, the LBC's 51, 53 and 55 have implemented, in parallel, the processing technique of the present invention, but for only a portion, or "partition" of the superlattice, corresponding in width to the number of parallel LBC's employed. This partition will be referred to as "partition 1". After processing partition 1, the LBC's 51, 53 and 55 are now supplied with autocorrelation coefficients $r_3$–$r_6$, in order to implement a second partition, referred to in FIG. 9 as "partition 2". The LBC's process the autocorrelation coefficients to produce the first intermediate values $\zeta_n^1$, where n=−5, 6, −4, 5, −3 and 4, which values, except for $\zeta_{-5}^1$, are fed back to the basic cells 51, 53 and 55, along with the single intermediate value $\zeta_{-2}^1$, stored during the processing of partition 1. Note that only a single first intermediate value produced during partition 1 is used during the processing of partition 2, in contrast with the implementation using BBC's, described in the parent application, which requires that two first intermediate values produced during partition 1 be used during the processing of partition 2.

The processing of partition 2 continues in a similar manner, until it is complete. As will be appreciated, during the processing of the first two partitions, the lattice coefficients which have been produced ($k_1$–$k_7$) are stored. It will also be appreciated that during the processing of partitions 1 and 2, basic cells 51, 53 and 55 operate to "cut through" the superlattice in parallel, in order to provide lattice coefficients $k_2$–$k_4$, in partition 1, and then recursively "cut through" the superlattice in parallel, to produce lattice coefficients $k_5$–$k_7$ in partition 2. There now only remains the processing for the last lattice coefficient $k_8$, which is accomplished in a third partition, "partition 3". Since the system is of order 8, the processing during partition 3 requires only two LBC's, for example, 53 and 55. This is in contrast with the third partition shown in FIG. 6 of the parent application, which requires only a single BBC. Although there are three partitions in both cases (FIG. 9 of the present case and FIG. 6 of the parent), the number of partitions can vary between the two techniques.

Specifically, the following formulas relate the number of processors (n), the number of partitions ($n_p$), the system order (p) and the number of active processors in the last partition ($\alpha$):

LBC IMPLEMENTATION
$\alpha = (p) \text{ modulo}(n)$
$n_p = [p/n]$
if $\alpha \neq 0$, then $n_p \leftarrow n_p + 1$
else $\alpha \leftarrow n$ -continued
BBC IMPLEMENTATION $\alpha = (p - 1) \text{ modulo}(n)$
$n_p = [(p - 1)/n]$
if $\alpha \neq 0$, then $n_p \leftarrow n_p + 1$
else $\alpha \leftarrow n$ where the brackets "[ ]" indicate the integer part of the argument.

As mentioned above, an inspection of FIG. 9 will reveal that only a single first intermediate value, $\zeta_{-2}^1$, a single second intermediate value, $\zeta_{-1}^2$, and a single third intermediate value, $\zeta_0^3$, produced during partition 1, need to be stored for the processing of partition No. 2, and likewise for those intermediate values produced during partition No. 2, for use with partition No. 3. This is in contrast with the BBC implementation of the parent application, where a pair of first intermediate values $\zeta_4^1$ and $\zeta_{-2}^1$, produced during partition 1, are necessary for partition 2, and so on. This leads to a simplified hardware implementation, where the size of the bordering buffer required to implement the structure of FIG. 9 need only be one-half the size of the bordering buffer required to implement the structure of FIG. 6 of the parent application.

Figure 10A:
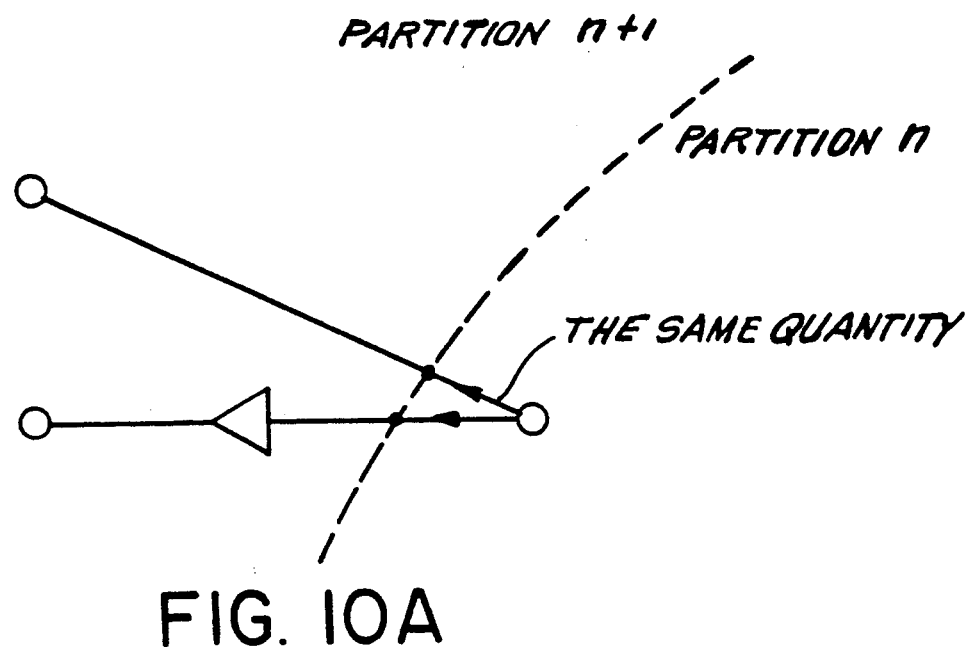
FIGS. 10A and 10B illustrate, in detail, the signal flow within the superlattice structure using lattice basic cells, and butterfly basic cells, respectively.
Figure 10B:
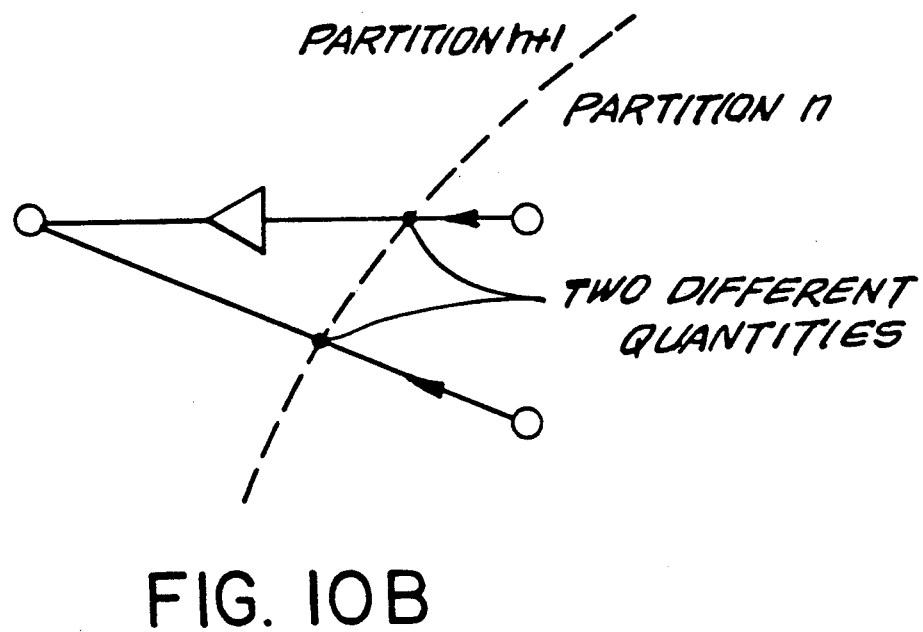
Figure 11:
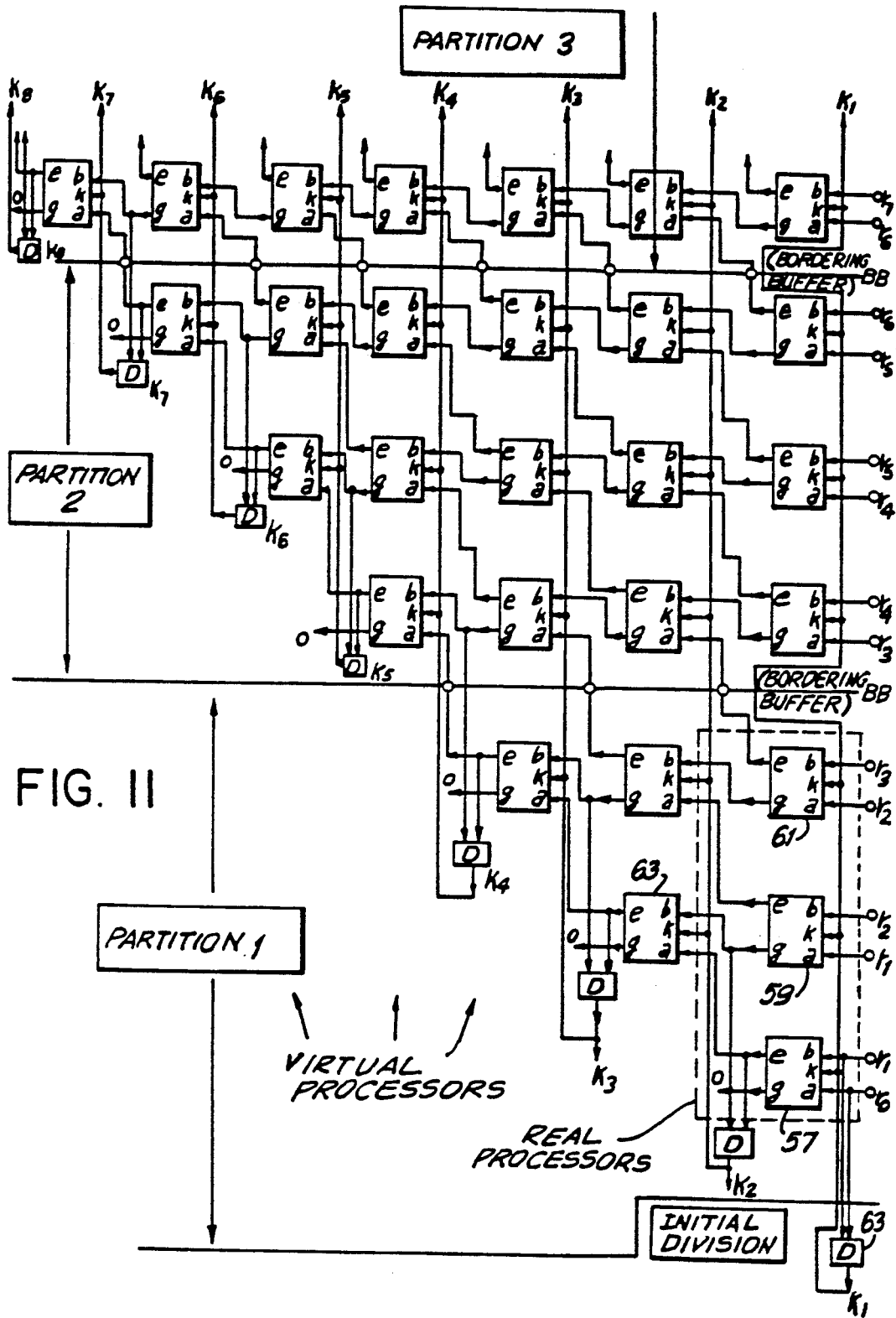
FIG. 11 illustrates the signal flow through real and virtual processors which implement the arrangement of FIG. 9.

This principle is briefly explained in FIGS. 10A and 10B, which illustrate the topology of signal flow between partitions in the LBC and BBC implementations, respectively. As shown in FIG. 10A, only a single value at any given time needs to be used from one partition to the next using the LBC implementation, while as shown in FIG. 10B, two different quantities must be stored at a given time for use in the succeeding partition, using the BBC implementation. Thus, a simplified bordering buffer can be realized, as illustrated in FIG. 11, which illustrates the signal flow through real and virtual processors implementing the arrangement of FIG. 9. Specifically, the signal processor is implemented using three parallel processors 57, 59 and 61, designated "real processors", which respectively include the basic cells 51, 53 and 55 of FIG. 9. Each of the processors 57, 59 and 61 can implement an LBC either as one "two-cycled" processor, or as two "one-cycled" processors. Also shown in FIG. 11, are a plurality of other processors, termed "virtual processors", the existence of which is simulated, in order to process an input signal in accordance with the superlattice structure of FIG. 9. Each of the processors 57, 59 and 61 receives a pair of adjacent autocorrelation coefficients at its a and b inputs, and functions to process the a and b inputs, along with the lattice coefficient k, to produce a pair of outputs e and g (also shown in FIG. 6). The first lattice coefficient $k_1$ is produced by dividing autocorrelation coefficients $r_1$ and $r_0$ in an initial divider 63. One of the first intermediate values, e, from processor 61 is stored in the bordering buffer, BB, as compared with two such first intermediate values stored in the bordering buffer of the parent application, shown in FIG. 7 therein.

First intermediate value e from processor 57 is applied to the a input of virtual processor 63 and first intermediate value g from processor 59 is applied to the b input of virtual processor 63, along with the second lattice coefficient, $k_2$, calculated from the quotient of first intermediate values e and g from real processors 57 and 59, respectively. Although illustrated as being transmitted to a further processor 63, the first intermediate values are actually fed back into the same real processors, as will be explained in more detail with reference to FIG. 12.

At each iteration through each partition, a new lattice coefficient is calculated, and only a single intermediate value needs to be stored for use in the succeeding partition.

Figure 12:
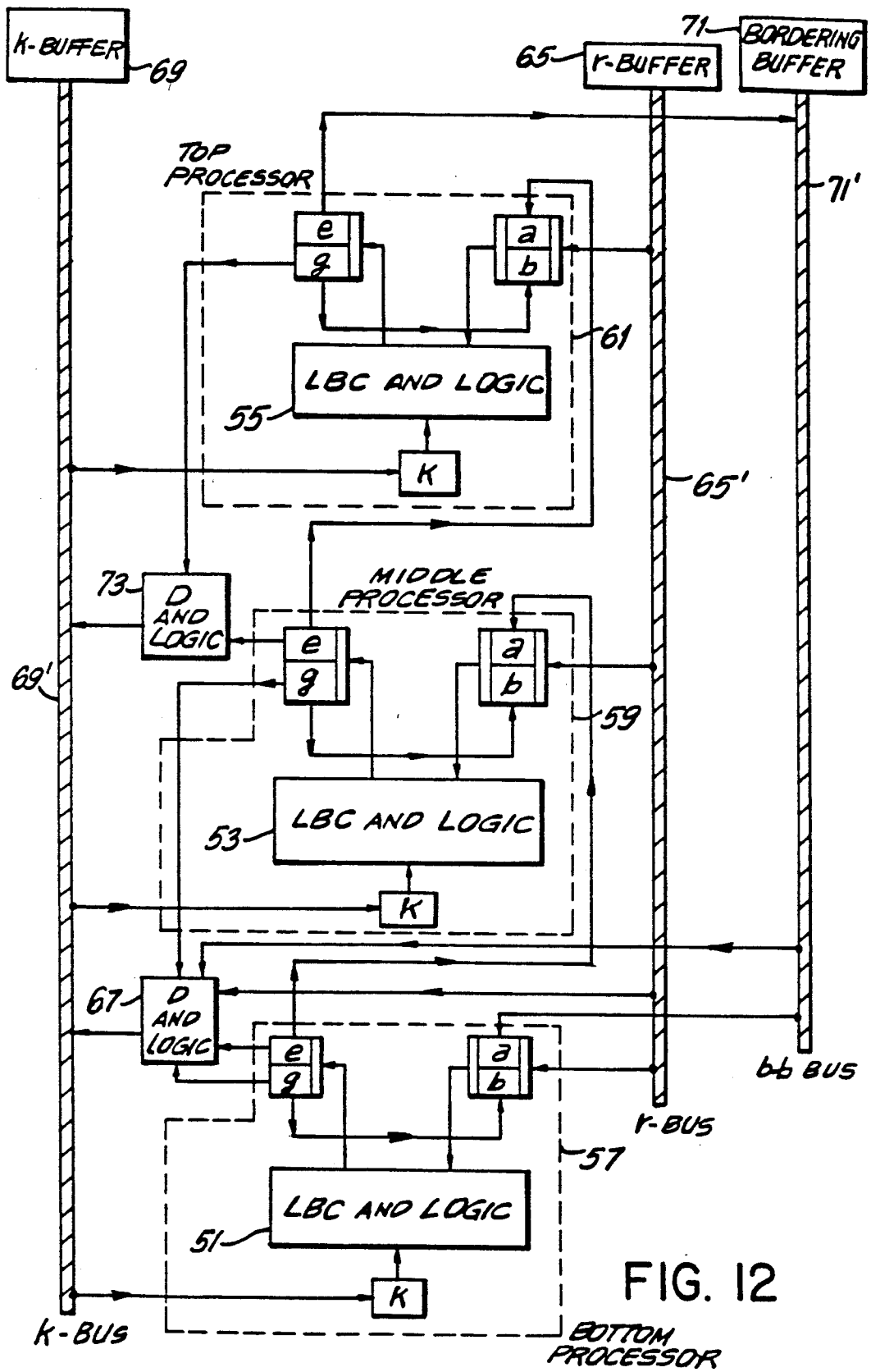
FIG. 12 illustrates a hardware implementation of the arrangement shown in FIGS. 9 and 11, in accordance with the present invention, illustrating the three lattice basic cells, and associated hardware.

FIG. 12 illustrates an example of an actual hardware implementation for providing the partitioned parallel process using LBC's. Specifically, the parallel processors 57, 59 and 61 are shown as including the LBC's 51, 53 and 55 of FIG. 9, respectively, and associated logic. Each processor also includes an a,b register and an e,g register, which function to individually store the values a, b, and e, g, associated with each basic cell (as illustrated in FIG. 6), and a k register, which stores the value of a lattice coefficient.

Each of the a,b registers receives the appropriate autocorrelation coefficients from an r-buffer 65, via r-bus 65'. The r-buffer also directly provides the first two autocorrelation coefficients $r_1$ and $r_0$ to divider 67 and associated logic, which accordingly calculates the initial lattice coefficient $k_1$. The output from divider 67 is applied to the k-buffer 69, via k-bus 69', for storage of the lattice coefficients used throughout the signal processing.

The outputs of the a,b registers in the three processors are connected to their associated LBC's. The third input to the LBC's is provided by its associated k register, which in turn receives its input from the k-buffer via the k-bus 69'. The output of each LBC is applied to the e,g register. The outputs of the e register in the bottom and middle processors are applied to the inputs of the a registers of the middle and top processors, respectively, while the output of the e register in the top processor is applied to the bordering buffer 71 via the bordering bus 71'. The outputs of the e registers in the bottom and middle processors are also applied to dividers 67 and 73, respectively, the former of which also receives an output from the g register of the bottom processor. In addition, the outputs of the g registers in each processor are applied to the inputs of the b registers of the associated processor, and in the case of the middle processor, the output of the g register is applied to divider 67, while in the case of the top processor, the output of the g register is applied to the divider 73. The outputs from the dividers 67 and 73 are applied to the k-buffer via the k-bus 69'. The divider 67 also receives as an input a signal from the bordering bus 71', as does the a,b register of the bottom processor 57.

The operation of the hardware shown in FIG. 12 to produce the superlattice processing structure illustrated in FIGS. 9 and 11 will now be described:

Phase 0—Initial Division ($k_1$ computation—storage—transmission)

The divider 67, attached to the bottom processor, accepts the first two autocorrelation coefficients from the r buffer 65 and produces $k_1$. All other elements are idle. $k_1$ is stored in the k-buffer 69 and transmitted to the k-register of each processor through the k-bus 69'.

Phase 1—Initialization of Partition 1

The a,b registers of all processors are initialized through the r-bus 65' with the proper autocorrelation coefficients.

Phase 2—Lattice Basic Cell computations

The LBC's of all processors compute intermediate values and store them in the e,g registers of each processor.

Phase 3—$k_2$ computation—storage—transmission

The divider 67 attached to the bottom processor computes $k_2$ from the e register of the bottom processor and the g register of the middle processor. $k_2$ is stored in the k-buffer 69 and transmitted to the a k-register of each processor through the k-bus 69'.

Phase 4—Initialization of the a,b registers of each processor, update of the bordering buffer 71

The following transfers take place:
e of the bottom processor→a of the middle processor.
e of the middle processor→a of the top processor.
e of the top processor→bordering buffer.
g of the middle processor→b of the middle processor.
g of the top processor→b of the top processor.

Phase 5—Lattice Basic Cell computation with the bottom element idle

The LBC's of the middle and top processor produce intermediate values which are stored in their corresponding e,g registers.

Phase 6—$k_3$ computation—storage—transmission

The divider attached to the middle processor computes $k_3$, fed by the e register of this processor and the g register of the top processor. $k_3$ is stored in the k-buffer 69 and transmitted to the k-register of each processor through the k-bus 69'.

Phase 7—Initialization of the a,b registers, update of the bordering buffer

The following transfers take place:
e of the middle processor→a of the top processor.
e of the top processor→bordering buffer.
g of the top processor→b of the top processor.

Phase 8—Top Lattice Basic Cell computation with the bottom and middle processors idle The top LBC computes intermediate values and stores them in its e,g register.

Phase 9—Bordering buffer update

The following transfer takes place:
e of the top processor→bordering buffer.

Phase 10 $k_1$ retransmission $k_1$, which has been stored in the k-buffer, is transmitted to the k-registers of all processors through the k-bus.

Phase 11 Initialization of partition 2

The a,b registers of all processors are initialized through the r-bus with the proper autocorrelation coefficients.

Phase 12 Lattice Basic Cell computations

The LBC's of all processors compute intermediate values and store them in the e,g registers of each processor.

Phase 13 Initialization of the a,b registers, update of the bordering buffer, and $k_2$ retransmission The following transfers take place: The a register of the bottom processor is initialized from the bordering buffer. $k_2$ is retransmitted to the k-registers of all processors.
e of the bottom processor→a of the middle processor.
e of the middle processor→a of the top processor.
e of the top processor→bordering buffer.
g of the bottom processor→b of the bottom processor.
g of the middle processor→b of the middle processor.
g of the top processor→b of the top processor.
The a register of the bottom processor must be initialized from the bordering buffer before the contents of the latter are destroyed by the storage of the newly computed contents of e register in the top processor.

Phase 14 Lattice Basic Cell computations

The same as Phase 12.

Phase 15 Initialization of the a,b registers, update of the bordering buffer, $k_3$ retransmission The same as Phase 13, but $k_3$ is retransmitted instead of $k_2$.

Phase 16 Lattice Basic Cell computations

The same as Phase 12.

Phase 17 $k_4$ computation - storage - transmission

The divider attached to the bottom processor computes $k_4$ fed by the g register of the bottom processor and a quantity from the bordering buffer. $k_4$ is stored in the k-buffer and transmitted to the k-register of each processor through the k-bus.

Phase 18 Initialization of the a,b registers, update of the bordering buffer The same as Phase 13, except for $k_2$ retransmission.

Phase 19 LBC computation

The same as Phase 12.

Phase 20 $k_5$ computation-storage-transmission

The same as Phase 3, but $k_5$ is computed-stored-transmitted instead of $k_2$.

Phase 21 Initialization of the a,b registers, update of the bordering buffer The same as Phase 4.

Phase 22 LBC computations with the bottom processor idle

The same as Phase 5.

Phase 23 $k_6$ computation-storage-transmission

The same as Phase 6, but $k_6$ is computed-stored-transmitted instead of $k_3$.

Phase 24 Initialization of the a,b registers, update of the bordering buffer The same as Phase 7.

Phase 25 Top LBC computations with the bottom and middle processors idle

The same as Phase 8.

Phase 26 Bordering Buffer update

The same as Phase 9.

Phase 27 $k_1$ retransmission

The same as Phase 10.

Phase 28 Initialization of partition 3

The same as Phase 11.

The continuation through the third partition will be understood by those skilled in the art in view of the foregoing.

The superlattice concept is suitable for efficient hardware implementation with commercially available processors. A small number of processors, i.e., 3 to 6 may be used for many applications with very good results and a substantial increase in processing speed over that of prior art signal processors.

It will thus be appreciated that the present invention allows the use of a feasible number of parallel processors to perform highly efficient linear prediction signal processing. When so implemented, the parallel-partitioned implementation provides the benefits of parallel processing, manageable hardware complexity, and optimal signal processing for a given number of available processors. It will also be appreciated that by using the LBC's, hardware complexity can be minimized.

Various changes and variations to the present invention will occur to those skilled in the art in view of the foregoing description. It is intended that all such changes and variations be encompassed so long as the present invention is employed, as defined by the following claims.

What is claimed is:

1. A signal processor which receives autocorrelation coefficients $r_o$-$r_p$ from a system having order P, where P is an integer, for providing lattice coefficients $K_l$-$k_p$ of said system, comprising:

a plurality of physical parallel processing units, the number of which is less than the system order P, for receiving during a first time interval autocorrelation coefficients $r_o$ through $r_n$, where n is less than the system order P and is related to the number of said physical parallel processing units, said plurality of physical parallel processing units configured to concurrently produce first intermediate values $$\zeta_i^1 = r_i + k_1 r_{i-1}, \text{ for } i = 2 \text{ through } n, \text{ and}$$
$$\zeta_{-i}^1 = r_i + k_1 r_{i+1}, \text{ for } i = 0 \text{ through } n - 1;$$

feedback means for applying selected ones of said first intermediate values to at least one of said physical parallel processing units, to produce at least a plurality of second intermediate values $$\zeta_i^2 = \zeta_i^1 + k_2 \zeta_{2-i}^1, \text{ for } i = 3 \text{ through } n, \text{ and}$$
$$\zeta_{-i}^2 = \zeta_{-i}^1 + k_2 \zeta_{2+i}^1, \text{ for } i = 0 \text{ through } n - 2;$$

said first and second intermediate values being produced in succession within said first time interval; means for applying all remaining autocorrelation coefficients to at least one of said plurality of said physical parallel processing units if the system order P is less than or equal to 2n, and otherwise applying autocorrelation coefficients $r_n$ through $r_{2n}$ to said plurality of said physical parallel processing units, to thereby produce additional first and second intermediate values during a second time interval subsequent to said first time interval; and divider circuitry for dividing autocorrelation coefficient $r_1$ by $r_0$ to produce $k_1$, and for dividing first intermediate value $\zeta_2^1$ by $\zeta_0^1$ to produce $k_2$.

2. The signal processor of claim 1 wherein the number of said physical parallel processing units is equal to n, and each of said physical parallel processing units includes a lattice basic cell.

3. The signal processor of claim 2 wherein each of said processors is comprised to two single-cycled processing elements.

4. The signal processor of claim 2 wherein each of said processors is comprises of a single three-cycle processing element.

5. A signal processor which receives autocorrelation coefficients $r_{-p}, r_{-p+1} \ldots r_0 \ldots r_{p-1}, r_p$, of a system having order P, where P is an integer, for providing P normal lattice coefficients $k_1$-$k_p$, and P adjoint lattice coefficients $k_1$-$k_p$ of said system, comprising:

a plurality of physical parallel processing units, the number of which is less than twice the system order P, for receiving during a first time interval autocorrelation coefficients $r_{-n}$ through $r_0$, and $r_0$ through $r_n$, where n is less than the system order P and is related to the number of said physical parallel processing units, said plurality of physical parallel processing units configured to concurrently produce first intermediate values $$\zeta_i^1 = r_i + k_1 r_{i-1}, \text{ for } i = -(n-1) \text{ through } 0 \text{ and } 2 \text{ through } n,$$
$$\text{and}$$
$$\xi_i^1 = r_i + k_1^* r_{i+1}, \text{ for } i = -n \text{ through } -2 \text{ and } 0 \text{ through } n - 1;$$

feedback means for applying selected ones of said first intermediate values to at least a pair of said physical parallel processing units, to produce at least a plurality of second intermediate values $$\zeta_i^2 = \zeta_i^1 + k_2 \xi_{i-2}^1, \text{ for } i = -(n-2) \text{ through } 0 \text{ and } 3 \text{ through } n,$$
$$\text{and}$$
$$\xi_i^2 = \xi_i^1 + k_2^* \zeta_{i+2}^1, \text{ for } i = -n \text{ through } -3 \text{ and } 0 \text{ through } n - 2,$$

said first and second intermediate values being produced in succession within said first time interval; means for applying all remaining autocorrelation coefficients to at least a pair of said plurality of said physical parallel processing units if the system order P is less than or equal to 2n, and otherwise applying autocorrelation coefficients $r_{-2n}$ through $r_{-n}$ and $r_n$ through $r_{2n}$ to said plurality of said physical parallel processing units, to thereby produce additional first and second intermediate values during a second time interval subsequent to said first time interval; and divider circuitry for dividing autocorrelation coefficient $r_1$ by $r_0$ to produce $k_1$ and $k_1^n$, for dividing first intermediate value $\zeta_1^1$ by $\zeta_0^1$ to produce $k_2$, and for dividing first intermediate value $\zeta_2^1$ by $\zeta_0^1$ to produce $k_2^n$.

6. The signal processor of claim 5 wherein the number of said physical parallel processing units is equal to 2n, and each of said physical parallel processing units includes a lattice basic cell.

7. The signal processor of claim 6 wherein each of said processors is comprised of two single-cycled processing elements.

8. The signal processor of claim 6 wherein each of said processors is comprised of a single two-cycle processing element.

9. Apparatus for receiving autocorrelation coefficients of a system having an order, and for producing therefrom latice coefficients of said system, comprising;

a plurality of lattice basic cell parallel processing units, the number of which is less than the order of said system, each of said processing units having input and output terminals and producing values at said output terminals as a function of values applied to said input terminals in accordance with a predefined recursion;

a buffer for initially applying to said input terminals of said plurality of parallel processing units less than all of said autocorrelation coefficients;

controlled feedback circuitry for feeding back selected ones of the values produced at the output terminals of said parallel processing units to selected input terminals thereof, said controlled feedback circuitry continuing said feeding back of selected outputs of said processing units to selected input terminals to thereby produce a first partition;

said buffer applying additional autocorrelation coefficients to said input terminals of at lest one of said plurality of parallel processing units after said first partition is produced, and said controlled feedback circuitry thereby producing at least a second partition; and divider circuitry for dividing selected ones of the values produced at the output terminals of said parallel processing units by other selected values produced at said output terminals to thereby produce said lattice coefficients.

10. The apparatus of claim 9 further including a storage device for storing values from at least one selected output terminal of at least one of said processing units during said first partition, said storage device providing said stored values to an input terminal of at least one of said processing units during said second partition.

11. The apparatus of claim 9 wherein said controlled feedback circuitry feeds back selected ones of the values produced at the output terminals of said processing units to the input terminals of a lesser number of said processing units then a the number o processing units from which said selected ones of said values were taken, and said controlled feedback circuitry continues said feeding back until said selected outputs are fed back to a single processing unit.

12. The apparatus of claim 9 wherein said buffer initially applies a number of autocorrelation coefficients to said parallel processing units, said number being related to the number of said parallel processing units.

13. Apparatus for receiving autocorrelation coefficients of a system having an order, and for producing therefrom lattice coefficients of said system, comprising:

a plurality of lattice basic cell parallel processing units, the number of which is less than twice the parallel order of said system, each of said processing units having input and output terminals and producing values at said output terminal as a function of values applied to said input terminals in accordance with a predefined recursion;

a buffer for initially applying to said input terminals of said plurality of parallel processing units less than all of said autocorrelation coefficients;

controlled feedback circuitry for feeding back selected ones of the values produced at the output terminal of said parallel processing units to selected input terminals thereof, said controlled feedback circuitry continuing said feeding back of selected outputs of said processing units to selected input terminals to thereby produce a first partition;

said buffer applying additional autocorrelation coefficients to said input terminal of at least a pair of said plurality of parallel processing units after said first partition is produced, and said controlled feedback circuitry thereby producing at least a second partition; and divider circuitry for dividing selected ones of the values produced at the output terminals of said parallel processing units by other selected values produced at said output terminal to thereby produce said lattice coefficients.

14. The apparatus of claim 13 further including a storage device for storing values from at least one selected output terminal of at least one of said processing units during said first partition, said storage device providing said stored values to an input terminal of at lest one of said processing units during said second partition.

15. The apparatus of claim 13 wherein said controlled feedback circuitry feeds back selected ones of the values produced at the output terminals of said processing units to the input terminal of a lesser number of said processing units than the number of processing units from which said selected ones of said values were taken, and said controlled feedback circuitry continues said feeding back until said selected outputs are fed back to a single pair of processing units.

16. The apparatus of claim 13 wherein said buffer initially applies a number of autocorrelation coefficients to said parallel processing units, said number being related to the number of said parallel processing units.

17. A method for producing lattice coefficients of a system having an order, comprising:

receiving autocorrelation coefficients of said system;

initially applying less than all of said autocorrelation coefficients to the input terminals of a plurality of lattice basic cell parallel processing units, the number of which is less than the order of said system;

producing values at output terminals of said processing units as a function of values applied to said input terminals in accordance with a predefined recursion;

feeding back selected ones of the values produced at the output terminals of said parallel processing units to selected input terminals thereof;

continuing said feeding back of selected outputs to thereby produce and complete a first partition;

applying additional autocorrelation coefficients to said input terminals of at least one of said parallel processing units after said first partition is completed, to thereby produce at least a second partition; and dividing selected ones of the values produced at the output terminals of said parallel processing units by other selected values produced at said output terminals to thereby produce said lattice coefficients.

18. The method of claim 17 further comprising:

storing values from at least one selected output terminal of at least one of said processing units during said first partition; and applying said stored values to an input terminal of at least one of said processing units during said second partition.

19. The method of claim 17 wherein said step of feeding back comprises:
   feeding back selected ones of the values produced at the output terminals of said processing units to the input terminals of a less number of said processing units than the number of processing units from which said selected ones of said values were taken; and
   continuing said feeding back until said selected outputs are fed back to a single processing unit.

20. The method of claim 17 wherein said step of initially applying comprises the step of applying a number of autocorrelation coefficients to said parallel processing units, said number being related to the number of said parallel processing units.

21. A method for producing lattice coefficients of a system having an order, comprising:
   receiving autocorrelation coefficients of said system;
   initially applying less than all of said autocorrelation coefficients to the input terminals of a plurality of lattice basic cell parallel processing units, the number of which is less than twice the order of said system;
   producing values at output terminals of said processing units as a function of values applied to said input terminals in accordance with a predefined recursion;
   feeding back selected ones of the values produced at the output terminals of said parallel processing units to selected input terminals thereof;
   continuing said feeding back of selected outputs to thereby produce and complete a first partition;
   applying additional autocorrelation coefficients to said input terminals of at least a pair of said parallel processing units after said first partition is completed, to thereby produce at least a second partition; and
   dividing selected ones of the values produced at the output terminals of said parallel processing units by other selected values produced at said output terminals to thereby produce said lattice coefficients.

22. The method of claim 21 further comprising:
   storing values from at least one selected output terminal of at least one of said processing units during said first partition; and
   applying said stored values to an input terminals of at least one of said processing units during said second partition.

23. The method of claim 21 wherein said step of feeding back comprises:
   feeding back selected ones of the values produced at the output terminals of said processing units to the input terminals of a lesser number of said processing units than the number of processing units from which said selected ones of said values were taken; and
   continuing said feeding back until said selected outputs are fed back to a single pair of processing units.

24. The method of claim 21 wherein said step of initially applying comprises the step of applying a number of autocorrelation coefficients to said parallel processing units, said number being related to the number of said parallel processing units.

* * * * *